(12) United States Patent
Falkner et al.

(10) Patent No.: US 8,272,653 B2
(45) Date of Patent: Sep. 25, 2012

(54) STRUCTURES, ASSEMBLIES, AND METHODS FOR CONTROLLING VEHICLE SUSPENSION

(75) Inventors: Mark Falkner, Murray, UT (US); Curt Hildebrand, Murray, UT (US)

(73) Assignee: TeraFlex, Inc., Murray, UT (US)

( * ) Notice: Subject to any disclaimer, the term of this patent is extended or adjusted under 35 U.S.C. 154(b) by 46 days.

(21) Appl. No.: 12/822,048

(22) Filed: Jun. 23, 2010

(65) Prior Publication Data
US 2010/0327548 A1 Dec. 30, 2010

Related U.S. Application Data (60) Provisional application No. 61/219,692, filed on Jun. 23, 2009.

(51) Int. Cl.
*B60G 15/00* (2006.01)
(52) U.S. Cl. .................................. 280/124.145
(58) Field of Classification Search ........... 280/124.145, 280/124.147, 124.154, 124.164, 124.179
See application file for complete search history.

(56) References Cited

U.S. PATENT DOCUMENTS

2006/0043659 A1* 3/2006 Gofron et al. ................. 267/220
2011/0162928 A1* 7/2011 Wilson ..................... 188/322.19

OTHER PUBLICATIONS

Jones, J., "2002 Chevy 2500 4x4 Daystar Stinger Bumpstops: Bumptastic!" Off Road Magazine, Feb. 2010 <http://www.off-roadweb.com/tech1002or_daystar_evs_stinger_bumpstops/index.html> [retrieved Sep. 23, 2010] 3 pages.

* cited by examiner

*Primary Examiner* — Faye M. Fleming
(74) *Attorney, Agent, or Firm* — Christensen O'Connor Johnson Kindness PLLC (57) ABSTRACT

A suspension system for a land vehicle has at least one rear suspension device and at least one front suspension device. The rear suspension device includes a first biasing member disposed within a first housing and is configured for mounting on a rear axle housing of the land vehicle. The front suspension device includes a second biasing member disposed in a second housing and is configured to be at least partially received within a bump stop support of the land vehicle.

20 Claims, 12 Drawing Sheets

STRUCTURES, ASSEMBLIES, AND METHODS FOR CONTROLLING VEHICLE SUSPENSION

CROSS-REFERENCE TO RELATED APPLICATION

This application claims the benefit of U.S. Provisional Application No. 61/219,692, filed on Jun. 23, 2009, the disclosure of which is expressly incorporated by reference.

BACKGROUND

Off-road vehicles, such as JEEP® WRANGLER® vehicles, are continually being driven in more demanding terrain in addition to paved roads and highways. The wide range of driving conditions includes dirt and gravel roads, 4×4-only trails, off-road parks with large rock and log obstacles, desert roads, stream beds, water crossings, and manmade obstacle courses. These extreme terrain conditions require more effective suspension control, particularly designed with modified suspension systems that increase suspension travel and allow for larger tires.

Figure 7:
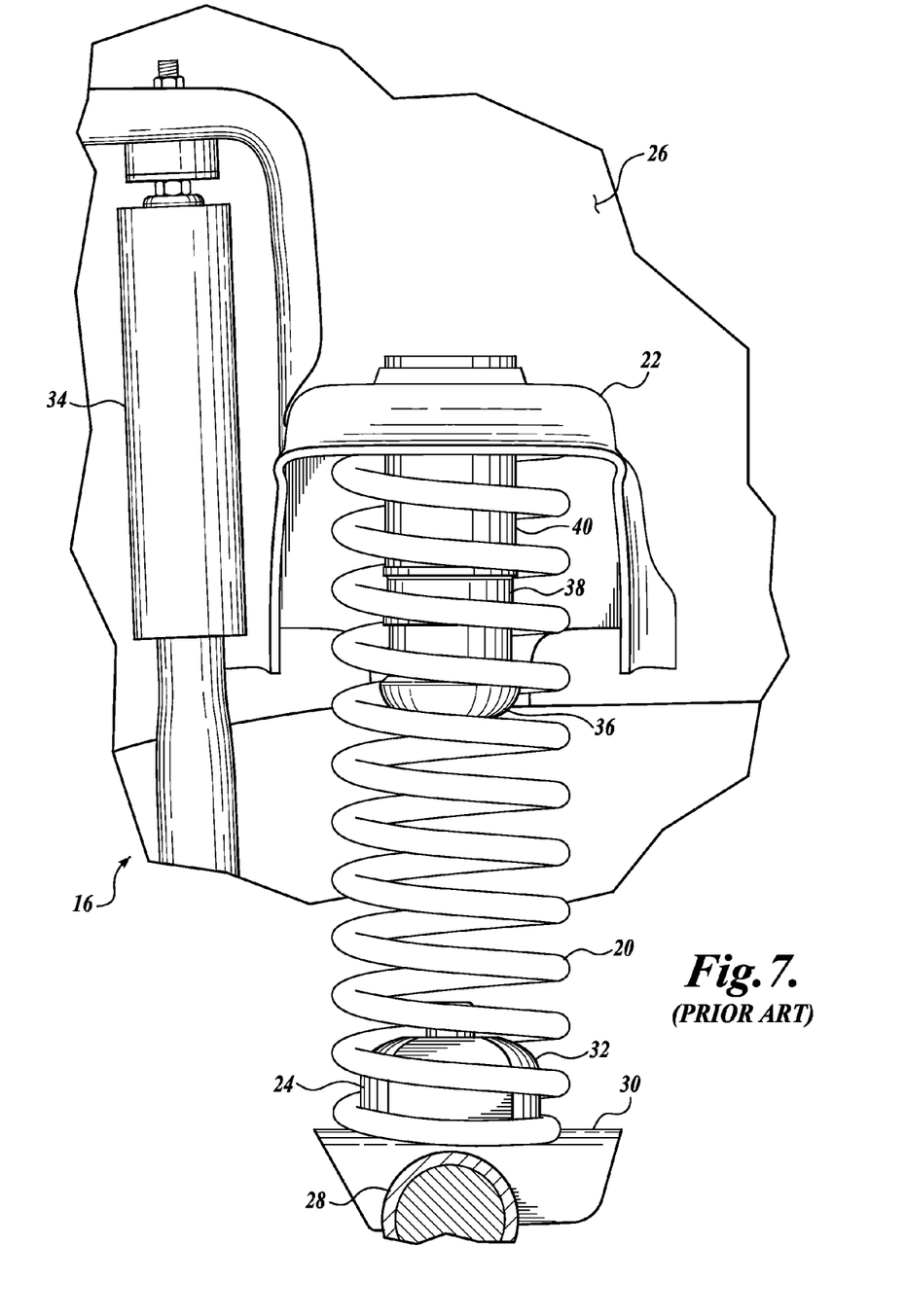
FIG. 7 is side view of a factory suspension system for a front passenger side of a JEEP® WRANGLER® vehicle, including a factory spring tower, a factory bump stop support, a factory bump stop cup, a factory bump stop, a factory front spring, and a factory shock absorber.
Figure 12:
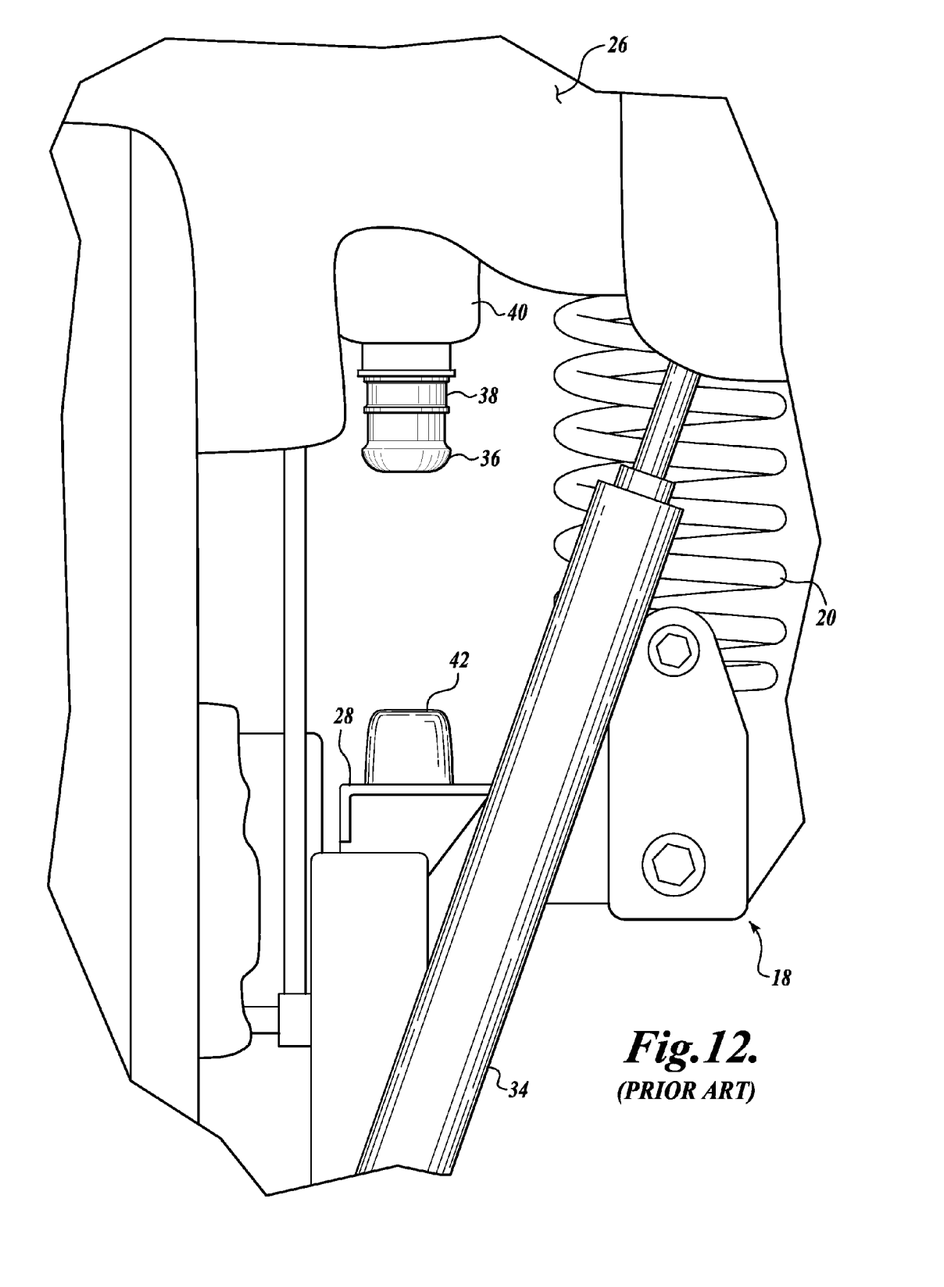
FIG. 12 is rear view of a factory suspension system for a rear driver side of a JEEP® WRANGLER® vehicle, including a factory bump stop, a factory axle mount bracket, a factory rear spring, and a factory shock absorber.

A well-known configuration for a suspension system for off-road vehicles includes a coil spring in conjunction with a shock absorber at each wheel. Exemplary embodiments of such a configuration are shown in FIGS. 7 and 12, wherein FIG. 7 shows a front suspension system 16, and FIG. 12 shows a similar rear suspension system 18. Referring to FIG. 7, the illustrated front suspension system 16 will be described with the understanding that the illustrated rear suspension system 18 of FIG. 12 operates in a similar manner.

As shown in FIG. 7, a coil spring 20 is disposed between a spring cup 22 and a spring tower 24 in a generally vertical position. The spring cup 22 is fixedly secured to the vehicle chassis 26 and includes a downward facing opening to receive the upper end of the coil spring 20. The spring cup 22 limits both upward vertical movement and lateral movement of the upper end of the coil spring 20 relative to the chassis 26. The spring tower 24 is fixedly mounted relative to the axle housing 28 of the vehicle and includes a base 30 that engages a bottom surface of the coil spring, as well as a tower portion 32 that extends into the lower end of the coil spring. The base of the spring tower limits movement of the coil spring in a downward direction relative to the axle, while the tower portion limits lateral movement of the coil spring relative to the axle.

With the upper end of the coil spring fixed relative to the chassis and the lower end of the coil spring fixed relative to the axle, the coil spring 20 compresses and expands to absorb motion of the associated wheel caused by irregularities in the surfaces upon which the vehicle is traveling. At the same time, the shock absorber 34 acts as damper to dissipate the energy absorbed by the spring. Thus, the coil springs 20 and shock absorbers 34 cooperate to allow the vehicle chassis to ride relatively undisturbed while the wheels follow the road, thereby improving both the ride and the performance of the vehicle.

In off-road driving conditions, vehicles are often subjected to extreme bumps or dips in the trail. The resulting impact to the tires can compress the spring to the point where part of the chassis would impact the axle housing, potentially damaging one or both components. To mitigate the risk of such impact damage, bump stops 36 are often installed to act as bumpers that prevent the chassis from directly impacting the frame.

The factory bump stop designed for JEEP® WRANGLER® vehicles 1997-current (2016 expected) is a microcellular foam bump stop 36 that is secured in a bump stop cup 38 to extend at least partially beyond the opening of the top cup. The bump stop cup 38 containing the bump stop 36 is secured to the lower end of a bump stop support 40, which is mounted on the frame side so that the bump stop extends downward toward the axle when the bump stop cup 38 is secured to the bump stop support 40. As shown in FIG. 7, the front bump stops 36 extend down through the center portion of the coil springs 20 and contact a top portion of the spring tower 24 when the coil springs are compressed beyond a certain point. Referring to FIG. 12, the rear bump stops 36 are positioned beside the coil springs 20, and when the coil springs are compressed beyond a certain point, the one or more of the bump stops contacts the associated bump stop fittings 42 that are mounted to the axle housing.

When a bump stop is engaged, it contacts the axle housing and, in effect, dampens the impact between the metal chassis frame and the metal axle housings. However, the factory bump stop is merely an elastic bumper and does not provide adequate suspension control for extreme terrain.

Therefore, there exists a need for improved suspension components for JEEP® WRANGLER® vehicles, as well as for other vehicles, that provide effective suspension control for extreme conditions. There also exists a need for improved suspension systems that, in addition to suspension control for extreme conditions, also provide a high level of comfort and drivability on normal highway conditions.

SUMMARY

A suspension system for a land vehicle is described, wherein the suspension system includes at least one rear suspension device and at least one front suspension device. The rear suspension device includes a first biasing member disposed within a first housing and is configured to be mounted on a rear axle housing of the vehicle. The front suspension device includes a second biasing member disposed in a second housing. The front suspension device is configured to be at least partially received within a bump stop support of the vehicle.

Also described is a suspension device for a land vehicle. The suspension device includes a housing and a compressible foam disposed within the housing. The suspension device is capable of supporting a load within the range of about 200 lbf to about 4500 lbf.

A method of providing rear suspension on a land vehicle includes obtaining a suspension device that has a housing and a compressible foam disposed in the housing, wherein the suspension device will support a load within the range of about 200 lbf to about 4500 lbf. The method further includes coupling the suspension device to a rear axle housing of the vehicle.

A method of providing front suspension on a land vehicle includes obtaining a suspension device that includes a housing and a compressible foam disposed in the housing, wherein the suspension device will support a load within the range of about 200 lbf to about 4500 lbf. The method further includes decoupling a factory device from the vehicle chassis and coupling the suspension device to the vehicle chassis.

Another suspension system for a land vehicle includes a first suspension device and a second suspension device. The first suspension device, which is configured for mounting on a rear axle housing of the vehicle, includes a first biasing member disposed in a first housing. The second suspension device of the suspension system is one of a spring and a shock absorber.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the present disclosure generally relate to structures and methods for controlling suspension compression in vehicles and have a particular application in JEEP® WRANGLER® vehicles. In that regard, replacing and/or adding components to the original factory suspension system increases vehicle load impact when the suspension is compressed during operation, for example, in rough terrain. The suspension systems and devices described herein are designed to allow for increased vehicle speed in extreme conditions and to maintain better vehicle stability in all driving conditions. Because JEEP® WRANGLER® vehicles are commonly considered to be secondary family vehicles in addition to extreme terrain vehicles, the systems and devices described herein must also be designed to perform on highways and in urban environments with a high level of comfort and drivability. Other suitable applications for structures and methods for controlling suspension compression described herein may include other vehicles, bicycles, motorcycles, airplane landing gear, and other apparatuses requiring suspension.

Referring to FIGS. 1-6, front and rear suspension devices 120 and 220, respectively, will be discussed. Although labeled as "front" and "rear" devices, this language is not intended to be limiting. Therefore, depending on the configuration of the vehicle, the suspension devices may be used interchangeably in either front or rear vehicle suspension applications. Further, it should be appreciated that systems described herein may include front or rear devices or a combination of front and rear devices. By way of one non-limiting example, a suitable system for a JEEP® WRANGLER® vehicle may include two front and two rear suspension devices. In that regard, front and rear suspension devices may be suitably sold individually, in pairs, or in two sets of pairs, for example, for adding suspension to both front and rear wheels on a vehicle.

It should be appreciated that the front and rear suspension devices specifically shown and described herein can be used on 1997-current (2016 expected) JEEP® WRANGLER® vehicle applications. In addition, the front suspension device can also be used on 1984-2001 JEEP® CHEROKEE® XJ vehicles, 1993-1998 JEEP® GRAND CHEROKEE® ZJ vehicles, and 1999-2004 JEEP® GRAND CHEROKEE® WJ vehicles. While the disclosed embodiments are directed toward application on various models of JEEP® vehicles, these embodiments are intended to be exemplary and should not be considered limiting. In this regard, the disclosed suspension devices can be adapted for use on a variety of vehicles that would benefit from the improved performance provided by the described suspension devices.

Figure 1:
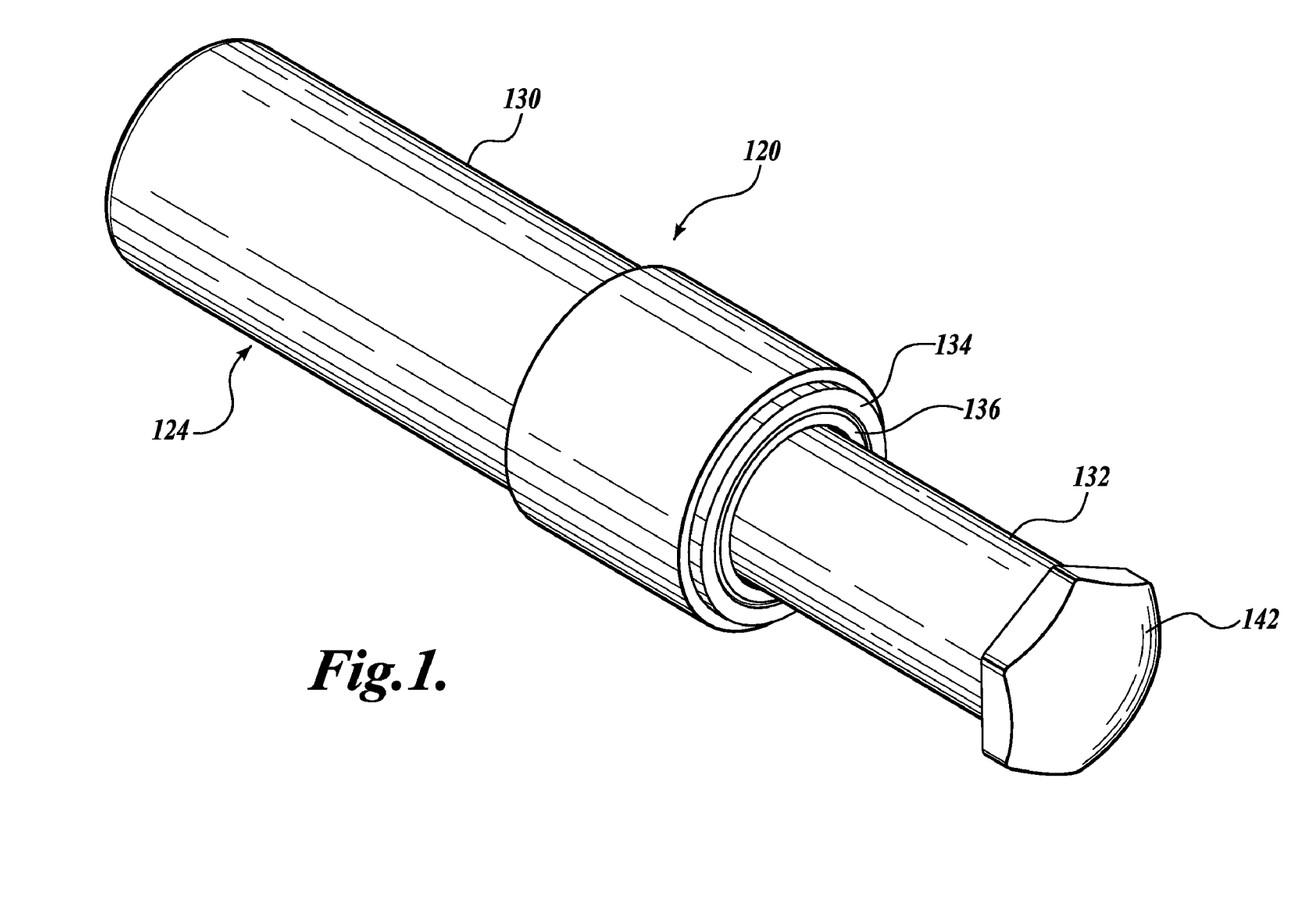
FIG. 1 is an isometric view of a front suspension device for a front suspension system on a land vehicle in accordance with one embodiment of the present disclosure.
Figure 2:
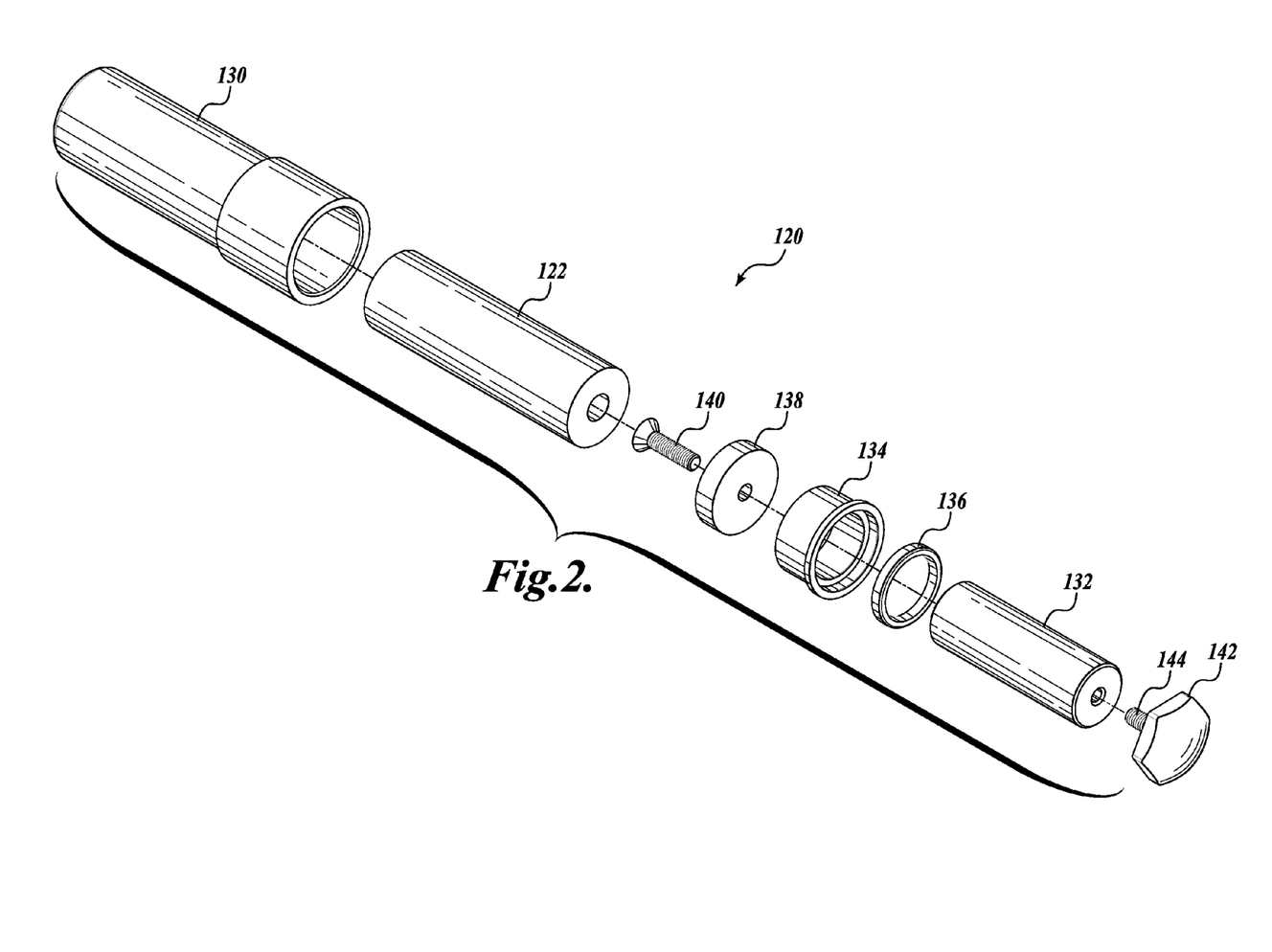
FIG. 2 is an exploded isometric view of the front suspension device of FIG. 1.
Figure 9:
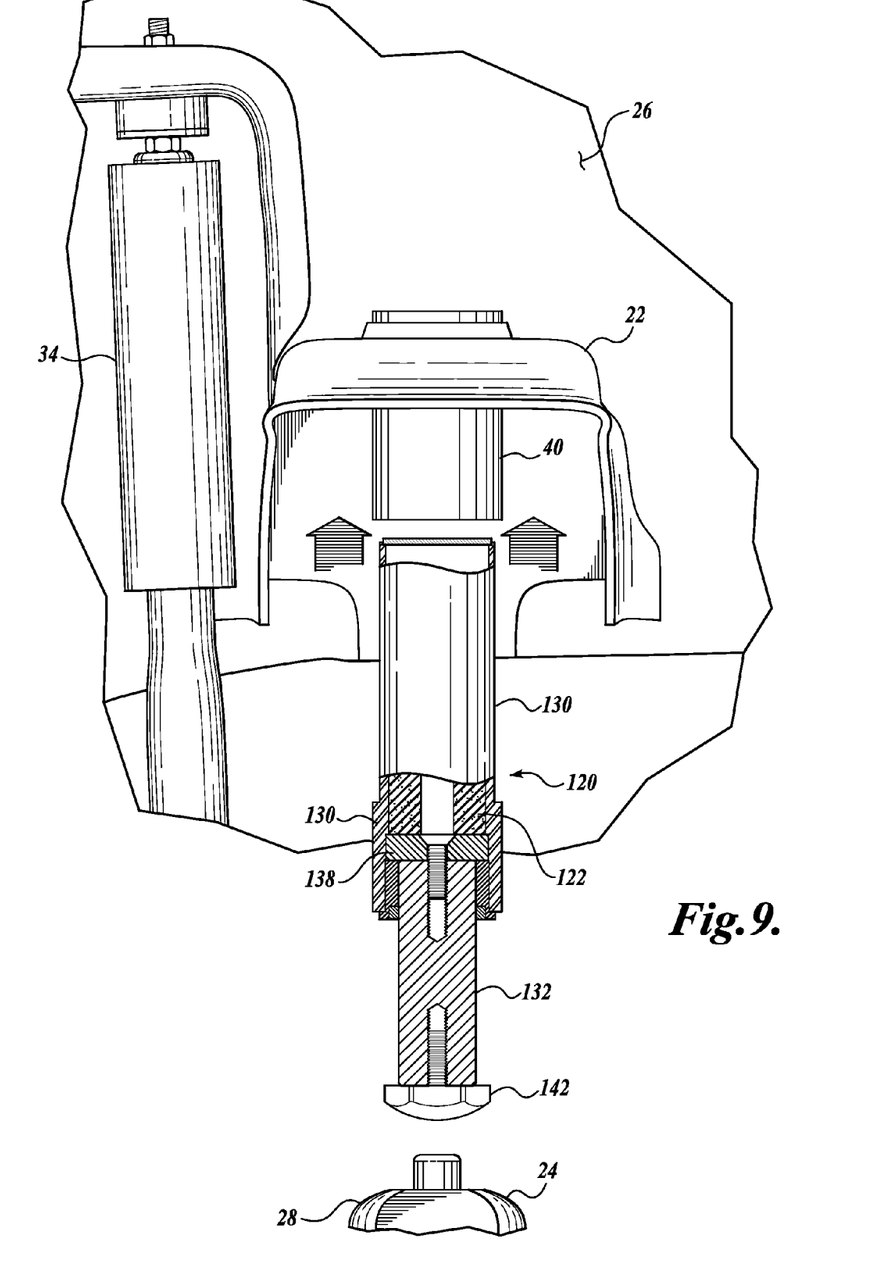
Figure 10:
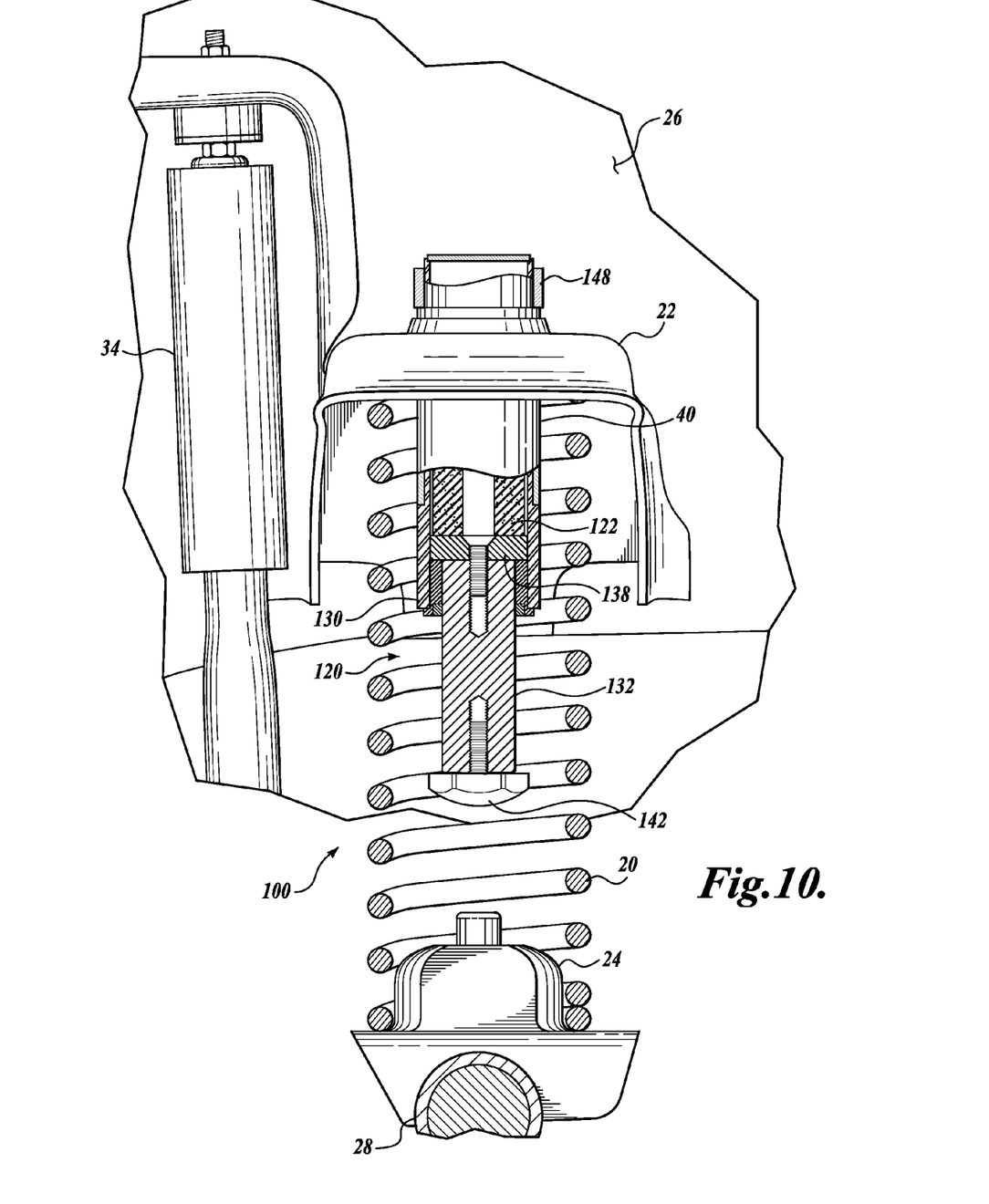
FIG. 10 is a side view of a front suspension system including the front suspension device of FIG. 1 mounted according to the method shown in FIGS. 8 and 9.

Referring to FIGS. 1 and 2, a front suspension device 120 for a front suspension system 100 on a land vehicle in accordance with one exemplary embodiment of the present disclosure is shown. The front suspension device 120 includes a biasing member 122 (see FIG. 2) and a housing 124 in surrounding relationship with the biasing member 122 (see FIG. 1). The housing 124 generally includes a cylinder 130 for receiving the biasing member 122. A first end of a shaft 132 is slidingly engaged with the cylinder to be movable between (1) an extended position, and (2) a retracted position, in which the shaft compresses the biasing member 122 within the housing 124. A plunger disc 138 is attached to the first end of the shaft 138 with a fastener 140. A bushing 134 is secured within the end of the cylinder 130 by a press fit interference or other suitable means. As best seen in FIGS. 9 and 10, the bushing 134 engages the plunger disc 138 to retain the plunger disc and, thus, the first end of the shaft 132 within the cylinder 130. A wiper seal 136 is nested in the bushing 134 and engages the shaft 132 to prevent dirt, water, and other debris from entering the cylinder 130 as the shaft 32 reciprocates between the extended and retracted positions. It should be appreciated that the housing 124 and its individual components may be formed from any suitable material. The cylinder 130, in particular is preferably formed from a suitable metal including but not limited to, aluminum, steel, and any alloys thereof, although any material with sufficient strength, stiffness, and resistance to impact and fatigue can be used.

A low profile bump stop 142 is threadedly coupled to the second end of the shaft 132. In the illustrated embodiment, the bump 142 includes an threaded protrusion 144 formed integrally with the bump stop 142; however, it should be appreciated that a separate threaded fastener or any suitable fastener or means for securing the bump stop 142 to the shaft 132 can be used. In another contemplated embodiment, the bump stop 142 is integrally formed with the shaft 132.

Figure 3:
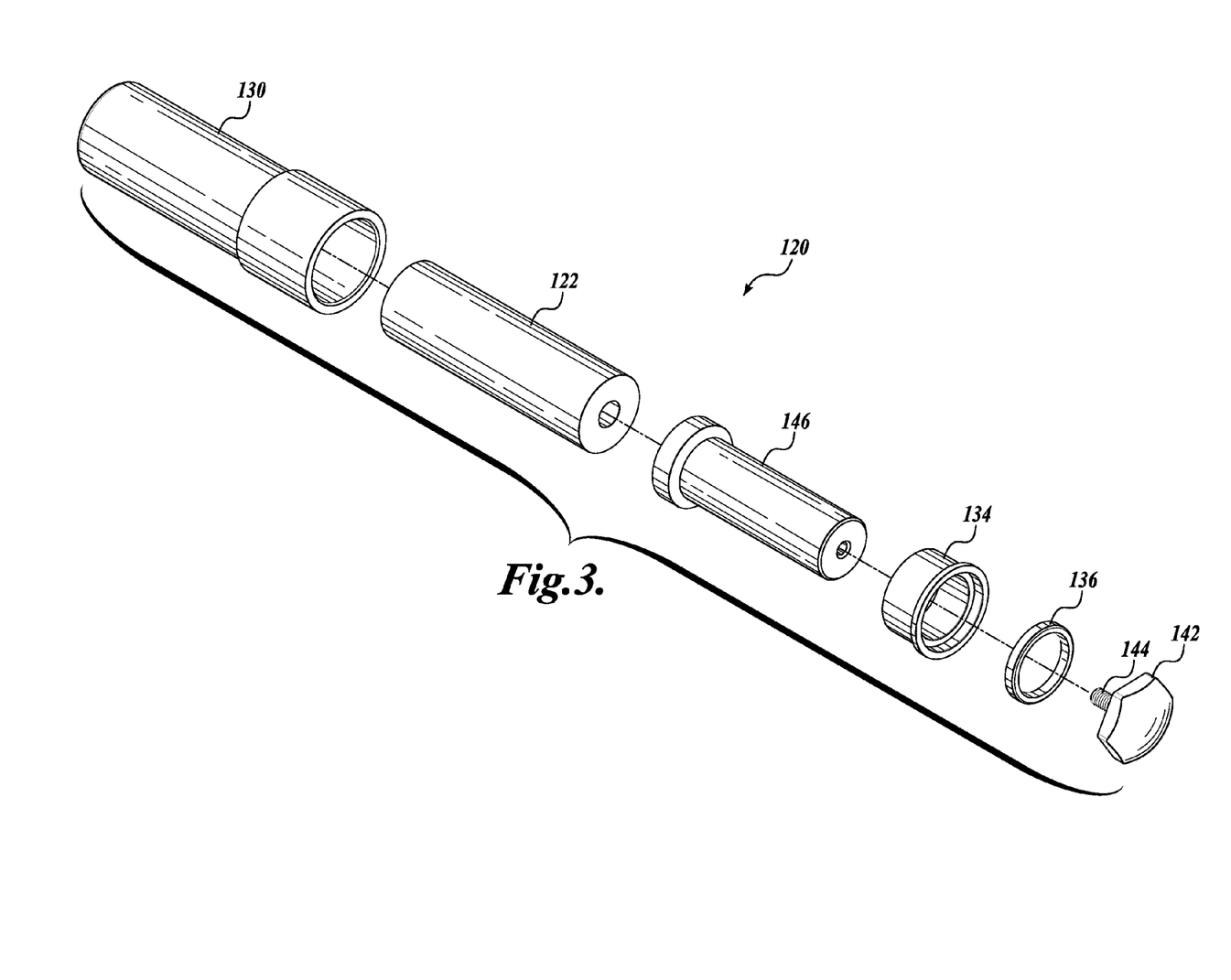
FIG. 3 is an exploded isometric view of an alternate embodiment of the front suspension device of FIG. 1.

FIG. 3 shows an alternate embodiment of the front suspension device 120, wherein the shaft 132 and the plunger disc 138 are integrally formed as a single plunger 146, thereby reducing part count and simplifying the assembly process. It should be appreciated that this and other alternate configurations that improve manufacturability are possible and should be considered within the scope of the present disclosure.

Figure 11:
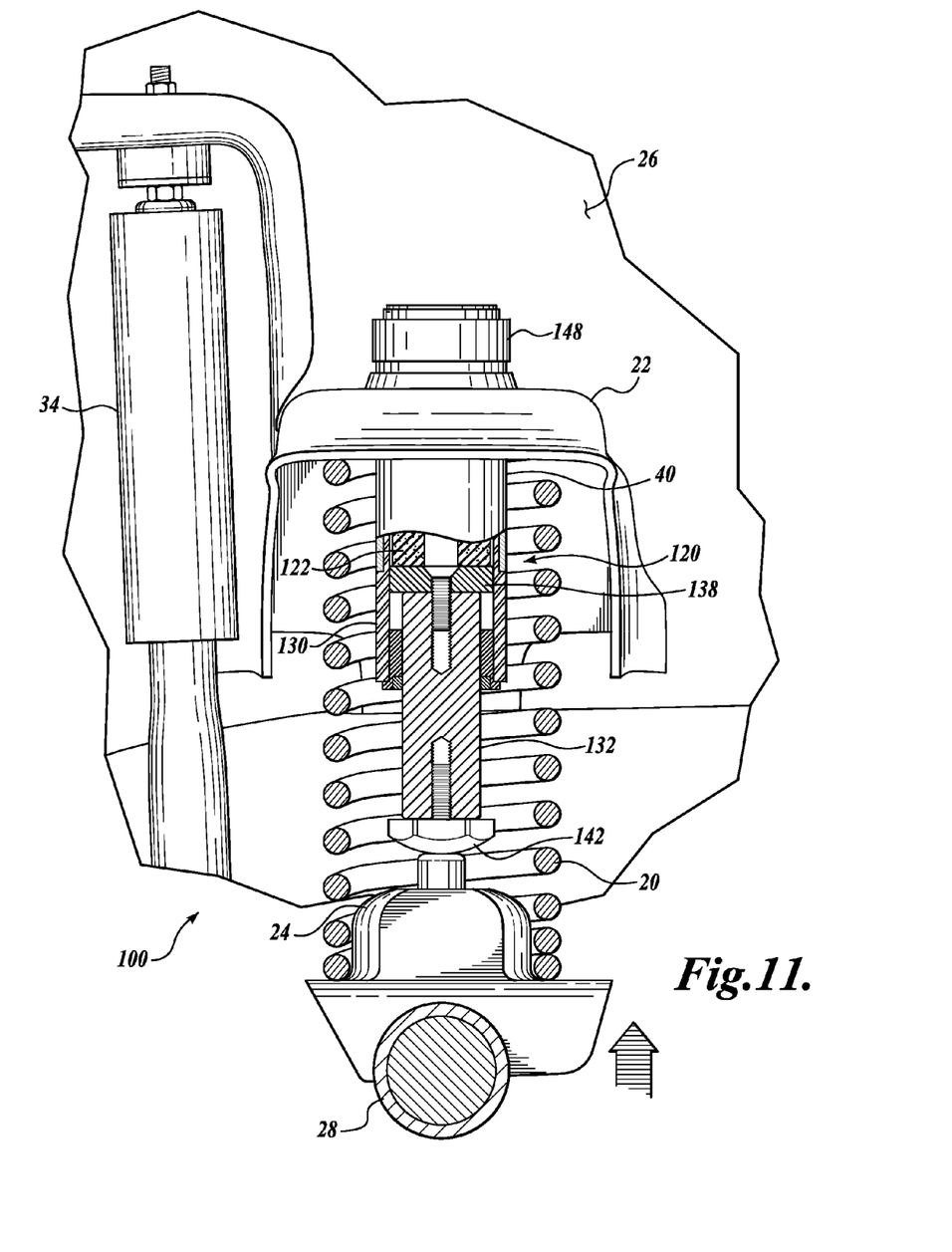
FIG. 11 is a side view of the front suspension system of FIG. 10, wherein the front suspension device is compressed by engagement with the axle housing of the vehicle.

As shown in FIG. 10, the shaft 132 is normally positioned in an extended position with the biasing member 122 in an uncompressed state. It should be appreciated that the thickness of the plunger disc 138 can be increased so that the biasing member 122 is partially compressed when the shaft 132 is in an extended position, thereby providing increased resistance. Similar results can be attained by increasing the length of the biasing member 122 so that it is partially compressed when the shaft 132 is in an extended position. When compressed, as shown in FIG. 11, the shaft 132 slides into the cylinder 130 so that the plunger disc 138 compresses the biasing member 122, which provides a resistive force to the shaft 132.

The biasing member 122 is formed from a compressible foam, such as a urethane foam. One suitable foam for use in the front and rear suspension devices described herein is a material, known by the trade name CELLULAR VULKOLLAN®. CELLULAR VULKOLLAN® material is a high density microcellular foam having a high compression strength, a low compression set, and a high elongation. CELLULAR VULKOLLAN® material is protected by a proprietary formula that uses nitrogen gas in the foam air bubbles and is based on one or more of the following chemistries: methylene diphenyl diisocyanate, toluene diisocyanate, and naphthalene diisocyanate. The material, generally a microcellular, closed-cell foam, has the following properties:

Dynamic stress (even in permanent load tests with 5 million cycles permanent deformation is extremely low);
Reduced water absorption (guarantees smooth operation during fluctuating weather conditions);
Reduced differences in properties at different temperatures (−30° C. to +80° C.);
High compressibility (70-80% compression);
Reduced transverse expansion;
Progressive pressure/compressive strain behavior; and
Reduced permanent deformation.

It will be appreciated that the use of CELLULAR VULKOLLAN® is exemplary and should not be considered limiting. In this regard, the use of any suitable material having properties similar to those of CELLULAR VULKOLLAN® is contemplated and should be considered within the scope of the present disclosure.

The housing 124 for the biasing member 122 optimizes compression control and enhances the progressive properties of the suspension device 120, allowing a vehicle to have a more controlled encounter with rough terrain and obstacles. In that regard, the housing 124 encases the biasing member 122 to provide a transverse force on the biasing member 122 and thereby limit transverse expansion of the biasing member 122 when the biasing member is vertically compressed. Such transverse support force improves the compression curve for a suspension device designed in accordance with embodiments of the present disclosure. In addition, such a configuration provides progressive suspension.

Without such encasement, the foam would not provide suitable suspension control or suitable progressive suspension as a result of transverse expansion. It should be appreciated that a foam biasing member 122, such as one made from CELLULAR VULKOLLAN®, may provide specific progressive suspension properties if the foam is sculpted in a way that the resistance provided by the biasing member has a particular non-linear profile. For example, if sculpted in a conical shape or another non-uniform shape, the biasing member 122 can be the designed such that the spring constant increases in a desirable manner as the biasing member 122 is compressed, i.e., the biasing member acts as a progressive spring.

The suspension devices 120 described herein are high load suspension devices. In that regard, a suitable suspension device 120 may provide progressive suspension to support a load within the range of about 200 lbf to about 4500 lbf depending on the compression distance achieved. In contrast, a typical spring shock or a typical air compression shock can provide progressive suspension to support a load within the range of 0 lbf to about 500 lbf depending on the compression distance achieved. It should be appreciated that a suspension device 120 can be used in combination with one or more other suspension components (such as a factory spring or air compression shock) or in lieu of a factory suspension component. When used in combination with other suspension components, the suspension system provides combined suspension performance in extreme terrains (for larger shock absorption) as well as drivability and comfort in normal highway driving conditions (for smaller shock absorption). It should be appreciated that the resistance in the front suspension device 120 may be increased or decreased by changing the configuration of the foam biasing member 122. For example, resistance may be increased by increasing the density of the foam biasing member 122 or the length of the foam biasing member 122. Conversely, resistance may be decreased by decreasing the density of the foam biasing member 122 or the length of the foam biasing member 122. In addition, the amount of resistance can be increased or decreased by changing the cross-sectional area of the biasing member by increasing or decreasing the outer diameter of the biasing member. Moreover, if the outer diameter of the biasing member 122 is fixed by design constraints, the resistance of the biasing member can be decreased by removing a center portion of the biasing member, such as by forming a hole through the biasing member along its longitudinal axis.

Because the suspension devices 120 described herein may be high load suspension devices, they can be used to effectively buffer shock load when a vehicle lands after being airborne. Airborne occurrences are common in high speed sand and desert racing/speeding applications. The buffering or progressive-controlled compression gained from the combination of the housing 124 and biasing member 122 design helps minimize vehicle damage. The suspension features are particularly effective for higher speed driving, although they can also be used for slow mountain roads or a "rock crawling" type of driving.

Advantages of the suspension systems described herein include the following:

Expected to have two to three times the life of other gas pressure or hydraulic models.
No maintenance, unlike the gas pressure models that leak and require charging usually after less than a year of use. Charging tools are expensive to own and require pressurized carbon dioxide.
Higher and more consistent performance than gas pressure models.
Pricing is expected to be at the same level or less than gas pressure models.
Simple installation especially in the rear application.
Lighter weight than gas pressure models.

Figure 8:
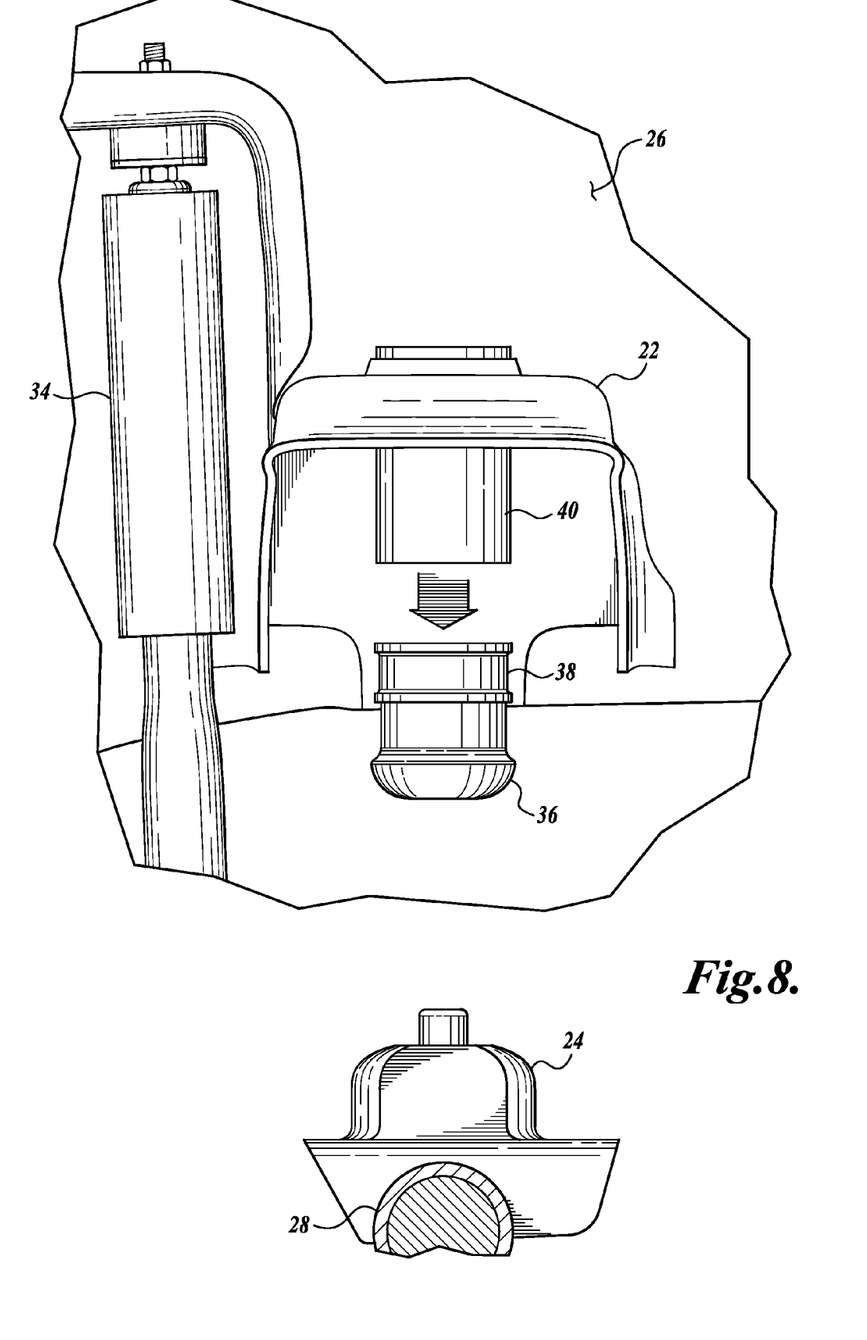
FIGS. 8 and 9 show side views of first and second steps, respectively, of a method of adapting the front suspension system of FIG. 7 to include the front suspension device of FIG. 1.

One exemplary method for installing the front suspension devices 120, for example, in JEEP® WRANGLER® vehicles, will now be described. Referring to FIGS. 7-9, installation of a front suspension device 120 will now be described. In FIG. 10, the front suspension device 120 is shown as installed, replacing the factory bump stop 36 (compare FIG. 7).

As best seen in FIG. 7, the factory suspension system for a front spring bump stop on the passenger side of a JEEP® WRANGLER® vehicle includes a factory spring cup 22, a factory spring tower 24, a factory bump stop support 40, a factory bump stop cup 38, a factory bump stop 36, a factory front spring 20, and a factory shock absorber 34. Referring to FIG. 8, the bump stop cup 38 is separated from the bump stop support 40 to create a mounting location for the front suspension device 120. In that regard, the bump stop cup 38 may be cut away from the bump stop support 40. As shown in FIG. 9, after separation of the bump stop cup 38 from the bump stop support 40, the cylinder 130 of the front suspension device 120 is inserted into the bump stop support 40. As best seen in FIG. 10, the front suspension device 120 is pushed upward into the bump stop support 40 until the a shoulder located on the cylinder 130 engages the edge of the bump stop support 40 to prevent further upward travel. When the front suspension device 120 is so positioned, a portion of the cylinder 130 extends through the upper surface of the spring cup 22. As shown in FIG. 10, a retaining clamp 148 is coupled to the portion of the cylinder that extends above the spring cup 22 to secure the suspension device 120 to the spring cup and, therefore, the chassis 26.

The front suspension device 120 may be sized to be the same or substantially similar to the factory bump stop support 40 in a JEEP® WRANGLER® vehicle to fit within the existing bump stop support 40. For example, in the JEEP® WRANGLER® vehicle application, the bump stop support (which is part of the vehicle chassis 26) has an inside diameter of 2.244 inches. The front suspension device 120 may have a diameter in the range of about 1.70 to about 2.30 inches to allow for easy installation in the bump stop support 40. As one non-limiting example, the front suspension device 120 has a diameter of about 2.226 inches. For this application, the diameter of the foam is preferably in the range of about 2.250 to 1.75 inches in diameter to fit within the housing 124, but also to provide adequate cushioning and suspension.

Now referring to FIG. 4, a rear suspension device 220 formed in accordance with another embodiment of the present disclosure will be described in greater detail. The rear suspension device 220 is substantially identical in materials and operation as the previously described embodiment, except for differences regarding the attachment position of the suspension device, which will be described in greater detail below. For clarity in the ensuing descriptions, numeral references of like elements of the suspension device 120 are similar, but are in the 200 series for the illustrated embodiment of FIGS. 4 and 5.

Figures 4, 5:
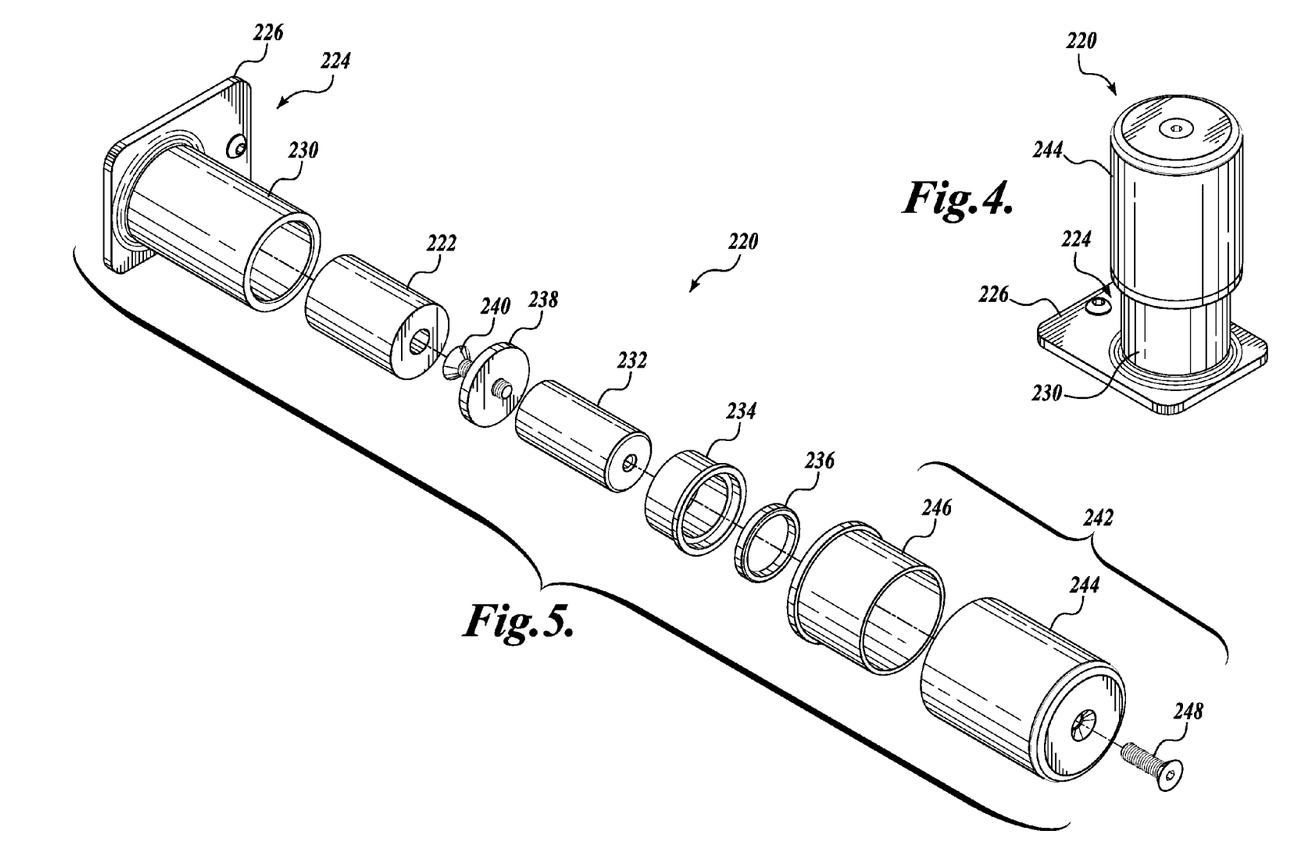
FIG. 4 is a isometric view of a rear suspension device for a rear suspension system on a land vehicle in accordance with a third embodiment of the present disclosure.
FIG. 5 is an exploded isometric view of the rear suspension device of FIG. 4.

Referring to FIGS. 4 and 5, a rear suspension device 220 for a rear suspension system 200 on a land vehicle in accordance with one embodiment of the present disclosure is shown. The rear suspension device 220 includes a biasing member 222 (see FIG. 5) and a housing 224 in surrounding relationship with the biasing member 222 (see FIG. 4). The housing 224 generally includes a cylinder 230 for receiving the biasing member 222. The housing 224 also includes a bracket mount 226 for attaching the cylinder 230 to the axle housing 28 of the vehicle (see FIG. 13).

A first end of a shaft 232 slidingly engages the cylinder 230 to be movable between (1) an extended position, and (2) a retracted position, in which the shaft compresses the biasing member 222 within the housing 224. A plunger disc 238 is attached to the first end of the shaft 238 with a fastener 240. A bushing 234 is secured within the end of the cylinder 230 by a press fit interference or other suitable means. Similar to the front suspension device 120 shown in FIGS. 10 and 11, the bushing 234 engages the plunger disc 238 to retain the plunger disc and, thus, the first end of the shaft 232 within the cylinder 230. A wiper seal 236 is nested in the bushing 234 and engages the shaft 232 to prevent dirt, water, and other debris from entering the cylinder 230 as the shaft 232 reciprocates between the extended and retracted positions.

Figure 6:
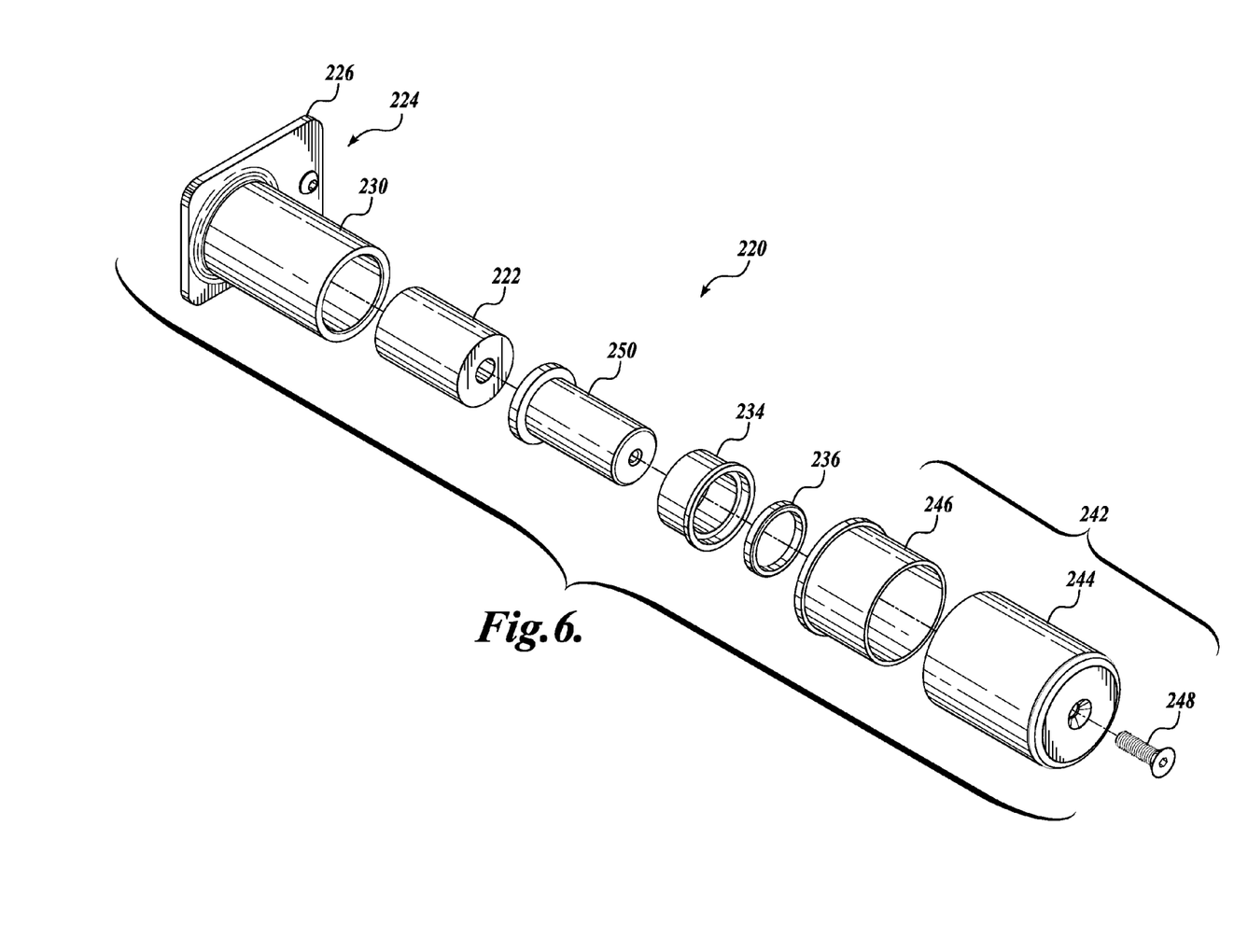
FIG. 6 is an exploded isometric view of an alternate embodiment of the rear suspension device of FIG. 4.

FIG. 6 shows an alternate embodiment of the rear suspension device 220, wherein the shaft 232 and the plunger disc 238 are integrally formed as a single plunger 250, thereby reducing part count and simplifying the assembly process. It should be appreciated that this and other alternate configurations that improve manufacturability are possible and should be considered within the scope of the present disclosure.

It should be appreciated that the housing 224 and its individual components may be formed from any suitable material. The cylinder 230, in particular is preferably formed from a suitable metal including but not limited to, aluminum, steel, and any alloys thereof, although any material with sufficient strength, stiffness, and resistance to impact and fatigue can be used.

An outer shield assembly 142 is secured to the second end of the shaft 232 with a threaded fastener 248 or other suitable means. The outer shield assembly 242 includes an outer shield 244, and outer shield bushing 246. When assembled (see FIG. 5), the shaft 232 is normally positioned in an extended position with the biasing member 222 in an uncompressed state. When compressed, the shaft 232 moves into the cylinder 230 so that the plunger disc 238 compresses the biasing member 222.

Figure 13:
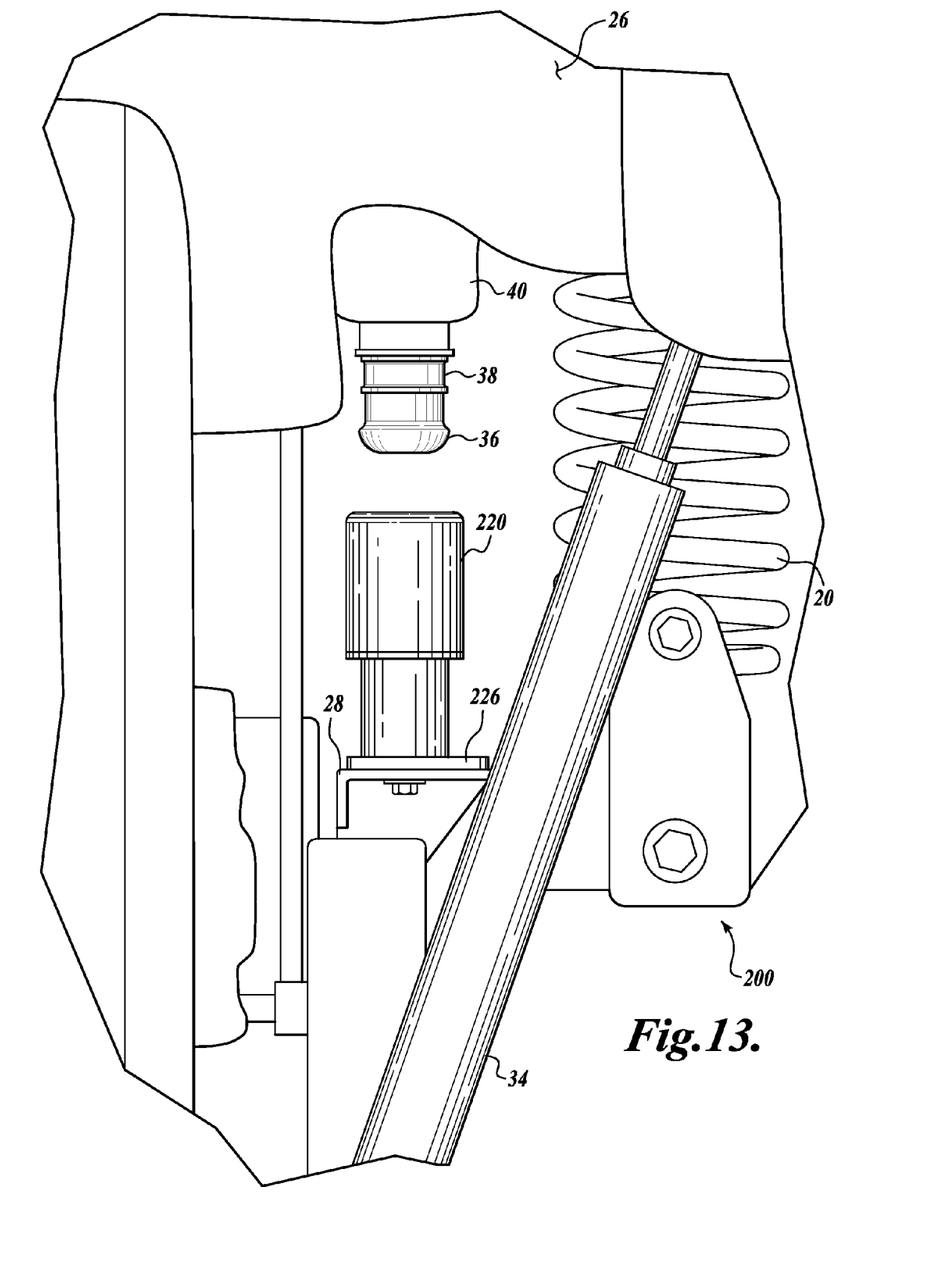
FIG. 13 is a rear view of a rear suspension system, including the rear suspension device of FIG. 4 mounted to the axle housing of the vehicle and further including a factory bump stop.

Installation of a rear suspension device 220 will now be described. Installation of the rear suspension device 220 merely requires removing the bump stop fitting 42, shown in FIG. 12, that is attached to the axle housing 28, and mounting the rear suspension device 220 of FIG. 4 in its place, as shown in FIG. 13. In the disclosed embodiment, the rear suspension device 220 is designed to be mounted to the axle housing 28 using the same mounting surface and fasteners as the bump stop fitting 42. Accordingly, no welding or modification to the axle housing 28 is necessary. It is contemplated, however, that alternate vehicle configurations may require modification of the axle housing 28, welding, or other modifications to mount the suspension device 220 to the axle housing, and such variations should be considered within the scope of the present disclosure.

Referring now to FIG. 13, the rear suspension device 220 is mounted such that the outer shield 244 extends upward toward the bump stop 36. Although the bump stop 36 of the illustrated embodiment is a standard, factory installed bump stop, it should be appreciated that other after-market or modified bump stops can be used in conjunction with the disclosed rear suspension device 220.

Still referring to FIG. 13, when the rear suspension device 220 is installed on a vehicle, the shaft 232 is normally positioned in an upward, extended position with the biasing member 222 in an uncompressed state. Like the previously described front suspension device 120, the thickness of the plunger disc 238 of the rear suspension device 220 can be increased so that the biasing member 222 is partially compressed when the shaft 232 is in an extended position, thereby providing increased resistance. Similar results can be attained by increasing the length of the biasing member 222 so that it is partially compressed when the shaft 232 is in an extended position.

In operation, when the coil springs 20 have been compressed beyond a predetermined limit, the bump stop 36 engages the outer shield 244 of the rear suspension device, which drives the shaft 232 into the cylinder 230 so that the plunger disc 238 compresses the biasing member 222 to provide a resistive force to the shaft 232. This, in turn better controls movement of the chassis relative to the axle. As result, similar to the previously described front suspension device 120, the rear suspension device 220 provides improved handling and performance as compared to factory bump stops.

While the preferred embodiments of the disclosure have been illustrated and described, it will be appreciated that various changes can be made therein without departing from the spirit and scope of the disclosure.

The embodiments of the invention in which an exclusive property or privilege is claimed are defined as follows:

1. A suspension system for a land vehicle, the system comprising:
    (a) at least one rear suspension device compressible along an axis, the rear suspension device comprising:
        (i) a rigid first housing comprising a first cavity and a first end surface located in the first cavity;
        (ii) a first shaft slidably engaging the first cavity; and
        (iii) a first biasing member comprising a compressible foam located in the cavity between the first end surface and the first shaft, wherein the rear suspension device is configured for mounting on a rear axle housing of the land vehicle; and
    (b) at least one front suspension device including a second biasing member disposed in a second housing, wherein the front suspension device is configured to be at least partially received within a bump stop support of the land vehicle.

2. The system of claim 1, wherein the land vehicle is an off-road vehicle.

3. The system of claim 1, wherein the second biasing member comprises a compressible foam.

4. The system of claim 1, wherein the compressible foam is generally a microcellular foam.

5. The system of claim 1, wherein the compressible foam is generally a closed cell foam.

6. The system of claim 1, wherein the second housing is a second rigid housing comprising a second cavity and a second end surface located in the second cavity, the front suspension device further comprising a second shaft slidably engaging the second cavity, wherein the second biasing member is disposed within the second cavity between the second end surface and the second piston.

7. The system of claim 1, wherein the rear suspension device is capable of supporting a load within the range of about 200 lbf to about 4500 lbf.

8. The system of claim 1, wherein the front suspension device is capable of supporting a load within the range of about 200 lbf to about 4500 lbf.

9. A suspension device for a land vehicle, comprising:
    (a) a rigid housing comprising a cavity and an end surface located in the cavity;
    (b) a shaft slidably engaging the cavity; and
    (c) a compressible foam disposed within the housing between the end surface and a first end of the shaft, wherein the suspension device will support a load within the range of about 200 lbf to about 4500 lbf.

10. The suspension device of claim 9, wherein a side surface of the cavity provides lateral support to the compressible foam as the compressible foam is compressed.

11. The suspension device of claim 9, wherein the compressible foam is compressed between the first end of the shaft and the end surface of the housing when the shaft is biased toward the housing.

12. The suspension device of claim 9, wherein the compressible foam provides progressive resistance to the shaft.

13. The suspension device of claim 12, wherein the compressible foam is formed to have a contoured profile.

14. The suspension device of claim 12, wherein the compressible foam is formed to have a tapered thickness.

15. The suspension device of claim 9, further comprising a bump stop positioned on a second end of the shaft.

16. The suspension device of claim 15, wherein the suspension device is sized and configured to be mounted to one of a chassis and an axle housing of the land vehicle, the bump stop engaging the other of the chassis and the axle housing to compress the compressible foam when the axle housing moves toward the chassis.

17. A method of providing rear suspension on a land vehicle, the method including:
    (a) obtaining a suspension device comprising:
        (i) a rigid housing comprising a cavity and an end surface located in the cavity;
        (ii) a shaft slidably engaging the cavity; and
        (iii) a compressible foam disposed in the housing between the end surface and the shaft, wherein the suspension device will support a load within the range of about 200 lbf to about 4500 lbf; and
    (b) coupling the suspension device to a rear axle housing of the vehicle.

18. A method of providing front suspension on a land vehicle, the method including:
    (a) obtaining a suspension device comprising:
        (i) a rigid housing comprising a cavity and an end surface located in the cavity;
        (ii) a shaft slidably engaging the cavity; and
        (iii) a compressible foam disposed in the housing between the end surface and the shaft, wherein the suspension device will support a load within the range of about 200 lbf to about 4500 lbf;
    (b) decoupling a factory device from the vehicle chassis; and
    (c) coupling the suspension device to the vehicle chassis.

19. A suspension system for a land vehicle, the system comprising:
    (a) a first suspension device comprising:
        (i) a rigid housing comprising a cavity and an end surface located in the cavity;
        (ii) a piston slidably disposed within the cavity; and
        (iii) a compressible foam disposed in the housing between the end surface and the piston, wherein the first suspension device is configured for mounting on a rear axle housing of the land vehicle; and
    (b) a second suspension device, wherein the second suspension device comprises one of a spring and a shock absorber.

20. The system of claim 1, wherein the compressible foam comprises a cellular polyurethane elastomer.

* * * * *